(12) United States Patent
Fujita et al.

(10) Patent No.: US 6,758,311 B2
(45) Date of Patent: Jul. 6, 2004

(54) BAND BRAKING DEVICE, AND METHOD OF MANUFACTURING ANNULAR BRAKE BAND

(75) Inventors: Kazuyuki Fujita, Fukuroi (JP); Shigeki Umezawa, Kakegawa (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/394,145

(22) Filed: Mar. 24, 2003

(65) Prior Publication Data

US 2003/0188934 A1 Oct. 9, 2003

Related U.S. Application Data

(63) Continuation of application No. 09/758,323, filed on Jan. 12, 2001, now abandoned.

(30) Foreign Application Priority Data

Jan. 13, 2000 (JP) .......................................... 2000-004886
Jun. 2, 2000 (JP) .......................................... 2000-166355

(51) Int. Cl.⁷ ............................................... F16D 51/00
(52) U.S. Cl. ................................. 188/77 W; 188/250 F
(58) Field of Search .......................... 188/77 W, 250 H, 188/259, 249

(56) References Cited

U.S. PATENT DOCUMENTS

| 3,367,466 A | 2/1968 | Lang ........................... 192/107 |
| 5,012,905 A | 5/1991 | Tanaka .................... 188/250 H |
| 5,083,642 A | 1/1992 | Stefanutti et al. ........ 188/77 W |
| 5,346,040 A | 9/1994 | Puchalla et al. ......... 188/77 W |
| 5,476,160 A | 12/1995 | Fenoglio et al. ......... 188/77 W |

FOREIGN PATENT DOCUMENTS

EP    0 544 406    6/1993

*Primary Examiner*—Douglas C. Butler
*Assistant Examiner*—Bradley T King
(74) *Attorney, Agent, or Firm*—Miles & Stockbridge P.C.

(57) ABSTRACT

A band braking device has an annular brake band having a frictional surface formed on the inner peripheral side thereof and a bracket fixed to an end portion thereof. Concave portions are formed on one of the bracket and the brake band, and convex portions are formed on the other to be engaged with the concave portions.

2 Claims, 13 Drawing Sheets

BAND BRAKING DEVICE, AND METHOD OF MANUFACTURING ANNULAR BRAKE BAND

CROSS-REFERENCE TO RELATED APPLICATIONS

This application is a continuation of Application Ser. No. 09/758,323 filed Jan. 12, 2001 now abandoned.

BACKGROUND OF THE INVENTION

1. Field of the Invention

The present invention relates to a band braking device and to a method of manufacturing an annular brake band to be used in an automatic transmission, or the like, for a car. The present invention further relates to a technology for improving the durability of such device and band.

2. Related Background Art

A band braking device is widely employed in an automatic transmission for a car or other industrial machines, in order to apply a brake on a transmission element or a rotary element. Usually, to form the band braking device, a frictional member is bonded onto the inner peripheral surface of an annular shaped steel plate, to form a brake band. Then, the diameter of this brake band is reduced by an actuator, to thereby fasten a transmission element or a rotary element provided inside the band to apply a brake. The brake band has an anchor bracket which is fixed to the fixed end side thereof, and an application bracket to an operational end side. Note that a double-wound band braking device is recently proposed which employs a double-wound brake band so as to reduce an operational force of the actuator or to enhance the brake controllability.

For manufacturing a brake band, an assembly worker generally sets a brake band, brackets, and the like, inside an unrepresented tool, and provisionally fastens these members by spot welding for alignment. After that, the brake band, the anchor bracket, and the like, are joined and integrated together by brazing. FIG. 20 is a longitudinal cross sectional view (of a first conventional device) for showing a joint between a brake band (the outer band of a double-wound brake band) 15 and an anchor bracket 21. In this Figure, a reference numeral 41 denotes a welded portion by the spot welding, and 35 denotes metallic wax used in the brazing, such as brass wax.

Incidentally, in the above-mentioned brake band, a large braking torque acts at braking. For this reason, when the brake band is used over a long time to exceed its predetermined durability, the metallic wax 35 is gradually peeled off from the joint, and the like, between the outer band 15 and the anchor bracket 21, and the peeled-off portion of the wax finally reaches the welded portion 41, as shown in FIG. 21. As generally known, since the welded portion 41 by the spot welding is structurally fragile, the stress is concentrated on a portion surrounding the welded portion 41. For this reason, when the thickness of the outer band 15 is set to be small in order to reduce the weight, a crack 43 is generated on the outer band 15 in the vicinity of the welded portion 41, as shown in FIG. 21, which may eventually destroy the outer band 15. In such case, the transmission function is impeded, and moreover a long period of time is required to repair the outer band 15. Thus, conventionally, it is necessary to employ a thick band as the outer band 15, which inevitably increases the weight of the band braking device, and consequently, the weight of the automatic transmission.

Meanwhile, as shown in FIG. 22, such a method is employed in some cases by which a through hole 51 is formed on the outer band 15, and a cylindrical convex portion 53 formed on the anchor bracket 21 is fitted in the through hole 51, so as to caulk the tip end of the convex portion 53 (a second conventional device). However, even by this method, the substantial width of the outer band 15 becomes small at a position where the through hole 51 is formed, so that, when the thickness of the outer band 15 is set to be small, a crack 43 may be generated on the outer band 15, as shown in FIG. 23. Another method is proposed, as shown in FIG. 24, by which the outer band 15 and the anchor bracket 21 are fixed together both by caulking and by brazing (a third conventional device) However, even by such method, the same problem occurs when the peeled-off portion of the metallic wax 35 reaches the caulking position.

SUMMARY OF THE INVENTION

The present invention has been contrived taking the above circumstances into consideration, and aims of providing a band braking device in which secured fixation between a brake band and a bracket, etc., is realized, while maintaining the strength of the brake band, as well as a method of manufacturing a brake band.

In order to solve the above problems, according to a first aspect of the present invention, there is proposed a band braking device having an annular brake band which has a frictional surface formed on the inner peripheral side thereof and a bracket fixed to an end portion thereof, characterized in that:

concave or recessed portions are formed on one of the bracket and the brake band, and convex or projected portions are formed on the other to be engaged with the concave or recessed portions.

According to this aspect of the present invention, for example, a plurality of concave or recessed portions are formed on either one of the brake band and the bracket, and the convex or projected portions are formed on the other to be fitted in these concave or recessed portions, so as to realize the alignment without forming a fragile portion in the brake band.

In the band braking device according to the first aspect of the present invention, the bracket and the brake band may preferably be fixed to each other by brazing. In this case, since there is no fragile portion in the brake band, the brake band is not destroyed even when the peeling-off of the wax progresses.

In the band braking device according to the first aspect of the present invention, the concave or recessed portions may be preferably formed on the bracket while the convex or projected portions on the brake band. In this case, even when the convex or projected portions are formed; for example, by pressing, no thin portion is formed in the brake band, so that the strength of the brake band may be maintained more securely.

In the band braking device according to the first aspect of the present invention, the concave or recessed portions and the convex or projected portions may be formed in the elongated forms extending in the circumferential direction of the brake band. Thus, even when, for example, the concave or recessed portions are formed on the brake band, the thickness of the concave or recessed portion in the width direction is less reduced so that the strength of the brake band may be maintained still more securely.

In the band braking device according to the first aspect of the present invention, the brake band may be formed as a double-wound brake band which comprises an intermediate band and an outer band. In this case, there is no fragile portion generated by the spot welding or a through hole even in an intermediate band or outer band having a small width, so that the strength thereof may be maintained still more securely.

According to the first aspect of the present invention, there is proposed also a method of manufacturing an annular brake band which has a frictional surface formed on the inner peripheral side thereof and a bracket fixed to an end portion thereof, comprising the steps of:

forming concave or recessed portions on either one of the bracket and the brake band, and convex or projected portions on the other to be engaged with the concave or recessed portions; and bringing the concave or recessed portions into engagement with the convex or projected portions so as to bond the bracket and the brake band together by brazing.

According to a second aspect of the present invention, there is proposed a band braking device having an annular brake band which has a frictional surface formed on the inner peripheral side thereof and a bracket fixed to an end portion on the outer peripheral side thereof, wherein the bracket and the brake band are bonded together by an adhesive member.

In the case of the band braking device according to this aspect of the present invention, after, for instance, a thermosetting adhesive is applied on the bracket or the brake band, the both members are brought into contact pressure and is heated to be securely bonded together.

Also, in the band braking device according to the second aspect of the present invention, preferably at least one of the bonded surfaces of the bracket and the brake band was subjected to a primer treatment. According to this feature of the second aspect of the present invention, after, for instance, a primer is sprayed onto the bonded surfaces of the bracket and the brake band, the both members are securely bonded together by an adhesive.

Also, in the band braking device according to the second aspect of the present invention, the bracket and the brake band may be preferably bonded together by caulking. According to this feature of the second aspect of the present invention, after, for instance, convex or projected portions formed on the bracket are fitted in holes formed on the brake band, the tip ends of the convex or projected portions are enlarged so that the both members are brought into contact by caulking, whereby the both members are bonded together by adhesive.

Also, in the band braking device according to the second aspect of the present invention, the bracket and the brake band may be preferably fixed to each other by spot welding. According to this feature of the present invention, after, for instance, the bracket is aligned with the brake band and the both members are fixed to each other by spot welding, the both members are bonded together by adhesive.

Also, in the band braking device according to the second aspect of the present invention, the concave or recessed portions are preferably formed on either one of the bracket and the brake band while the convex or projected portions are formed on the other to be engaged with the concave or recessed portions. In this case, after, for instance, the convex or projected portions formed on the bracket are fitted in the holes formed on the brake band, the both members are securely bonded together by an adhesive.

Also, according to the second aspect of the present invention, there is proposed a method of manufacturing an annular brake band which has a frictional member formed on the inner peripheral side thereof and a bracket fixed to an end portion on the outer peripheral side thereof, comprising the step of: thermally bonding the frictional member and the bracket at the same time to the brake band, after interposing a thermosetting adhesive between the frictional member and the bracket. In this method according to the second aspect of the present invention, after, for instance, the thermosetting adhesive is applied on the bonded surfaces of the frictional member and the bracket, these members are aligned with respect to the brake band and fixed by means of a jig, to be heated for a predetermined time inside a furnace, or the like.

DETAILED DESCIPTION OF THE PREFERRED EMBODIMENTS

Detailed description will be made on several embodiments of the present invention in which the present invention is applied to a double-wound band braking device of an automatic transmission for a car with reference to the attached drawings.

Figure 1:
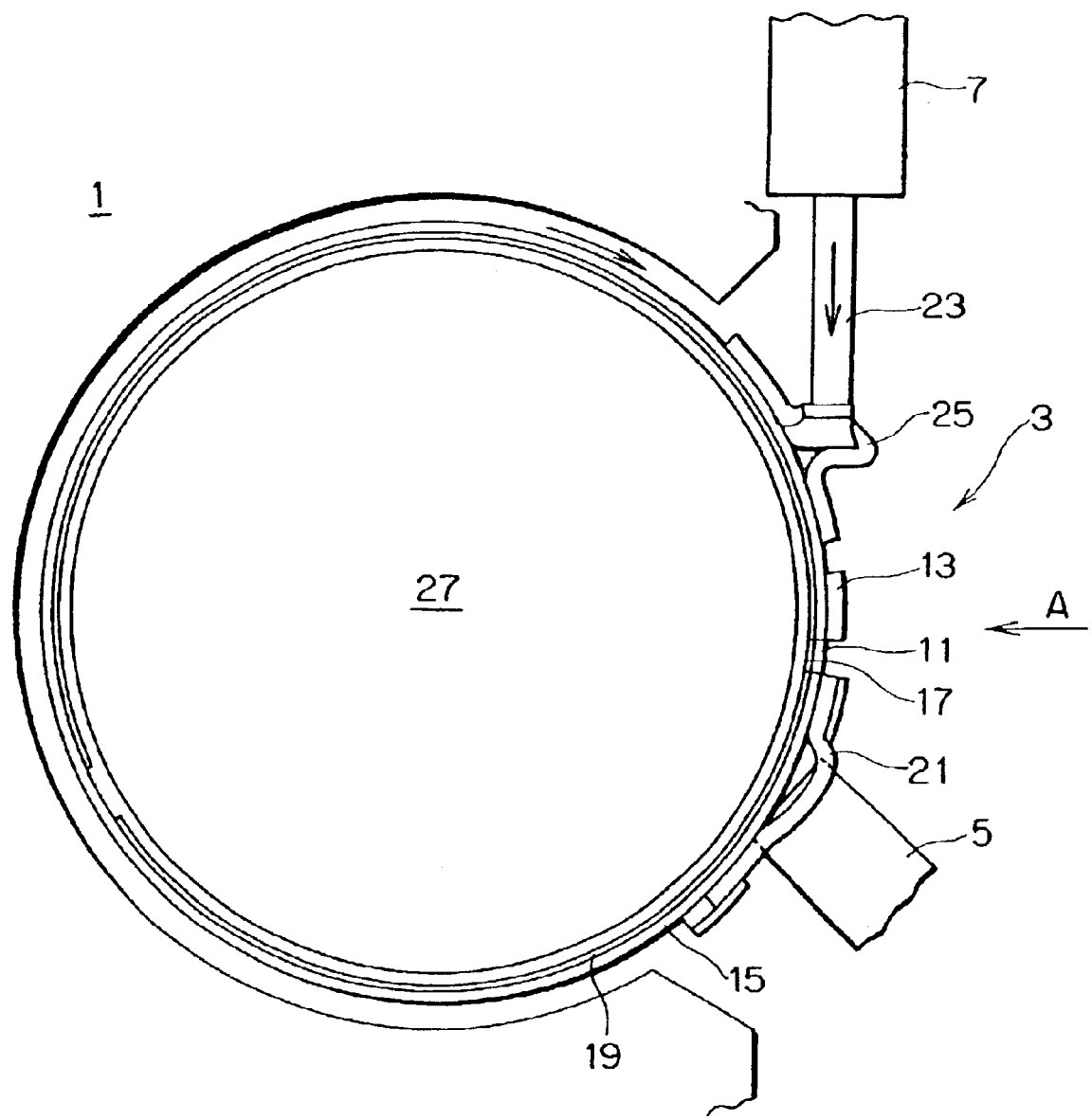
FIG. 1 is a side view for showing a double-wound band braking device according to the first embodiment of the invention.
Figure 2:
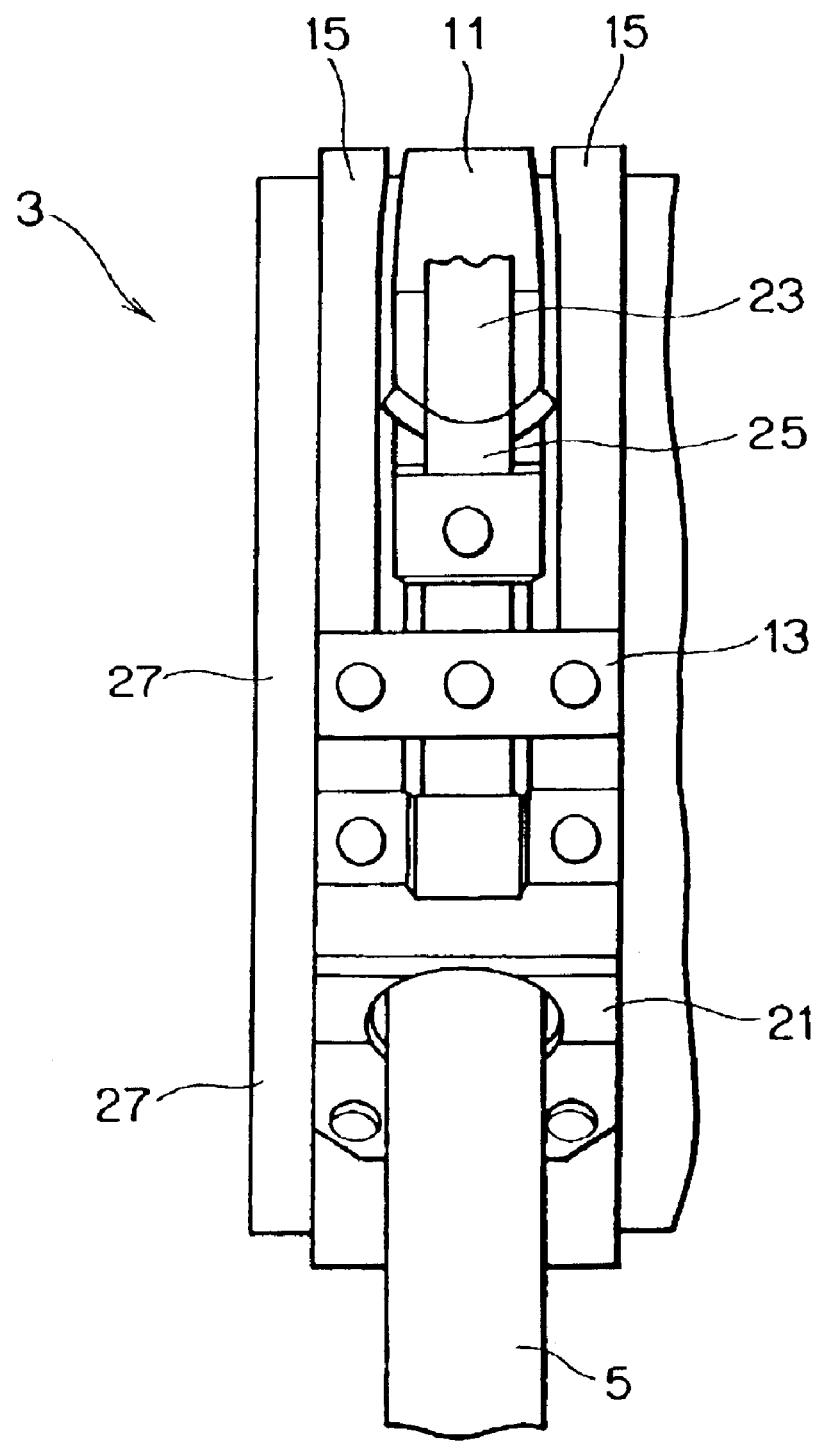
FIG. 2 is a view of the device shown in FIG. 1, seen from the direction indicated by the arrow A.

FIG. 1 shows a double-wound band braking device according to a first embodiment of the present invention, seen from a side surface thereof, while FIG. 2 shows the band braking device shown in FIG. 1, seen from the direction indicated by the arrow A (a front view). As shown in these drawings, the double-wound band braking device of the present embodiment comprises a main body casing (transmission casing) 1, a double-wound brake band 3 set inside the main body casing 1, an anchor pin 5 for fixing the double-wound brake band 3 to the main body casing 1, and an actuator 7 for driving the double-wound brake band 3.

The double-wound brake band 3 has as its main constituent members an annular intermediate band 11, and a pair of annular outer bands 15 each of which is fixed to the free end of this intermediate band 11 through a coupling plate 13 in a state where the free ends of the both bands are facing each other. Frictional members 17 and 19 are bonded on the inner peripheral surfaces of the intermediate band 11 and the outer band 15, respectively. While an anchor bracket 21 to be latched by an anchor pin 5 on the main body casing 1 is fixed to the operational end side of the outer band 15, an application bracket 25 which receives a force in the direction of contracting or reducing the diameters of the intermediate band 11 and the outer bands 15 by means of a push rod 23 of an actuator 7 is fixed to the operational end side of the intermediate band 11. In this double-wound brake band 3, when the push rod 23 of the actuator 7 is operated in the direction indicated by the arrow in FIG. 1, the diameters of the intermediate band 11 and the outer bands 15 are contracted or reduced, so as to apply a brake on a drum 27 which is fitted in the double-wound brake band 3.

Figure 3:
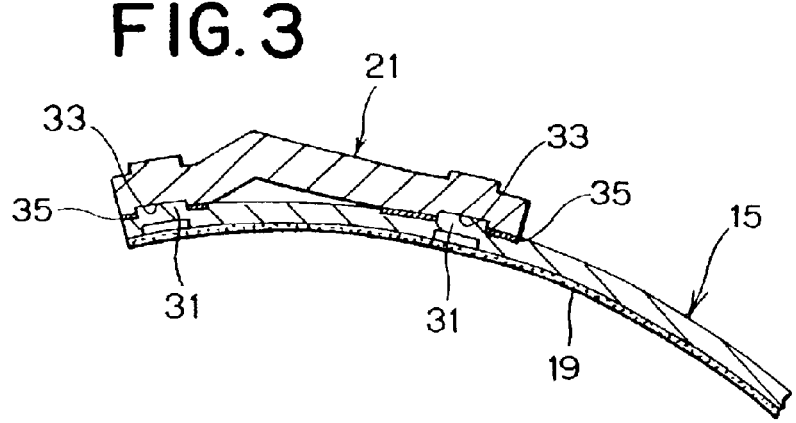
FIG. 3 is a longitudinal cross sectional view of a portion of the device for showing a joined portion between the outer band and the anchor bracket in the first embodiment.
Figure 4:
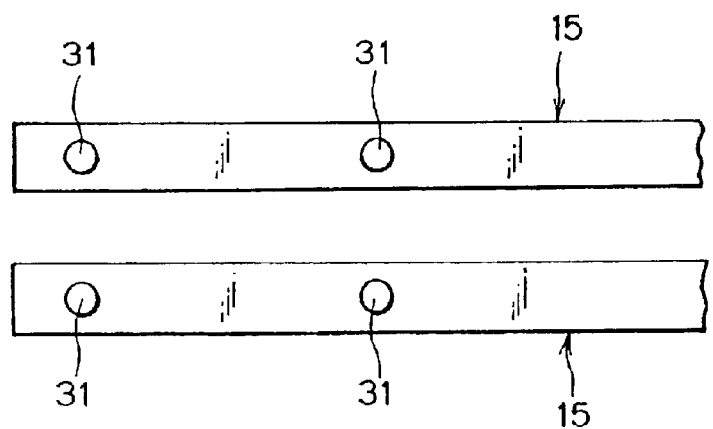
FIG. 4 is a plan view for showing the outer band according to the first embodiment.

In case of the first embodiment, as shown in FIGS. 3 and 4, a pair of circular convex or projected portions 31 are respectively formed on the outer bands 15, while circular concave or recessed portions 33 which are corresponding to the convex portions 31 are formed on the side of the anchor bracket 21. Note that the convex or projected portions 31 and the concave or recessed portions 33 are formed by pressing, which can be conducted simultaneously with a blanking work of the outer shape. The outer bands 15 and the anchor bracket 21 are brought into alignment by fitting the convex portions 31 in the concave portions 33 in an unrepresented tool, and then are brazed with metallic wax 35 which flows into a portion of contact therebetween.

Figure 5:
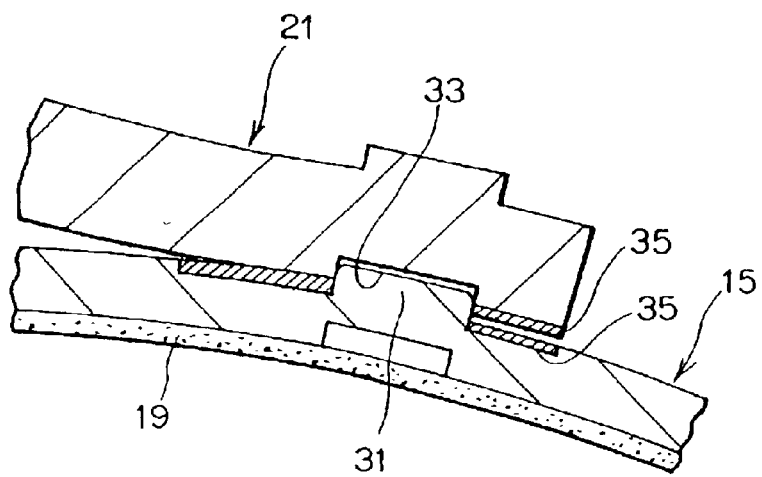
FIG. 5 is an explanatory view for illustrating an operation of the first embodiment.

In the first embodiment with such configuration, a fragile portion is not formed on the outer band 15, unlike in the conventional device. For this reason, as shown in FIG. 5, if the peeling off of the wax progresses up to the convex portion 31, no crack is generated on the outer band 15 and the life of the device is largely improved.

Figure 6:
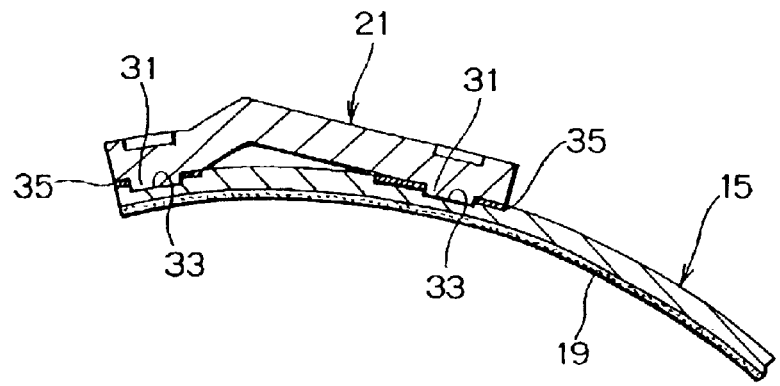
FIG. 6 is a longitudinal cross sectional view of a portion of the device for showing a joined portion between the outer band and the anchor bracket in the second embodiment.

FIG. 6 shows a longitudinal cross section of a portion of an outer band according to a second embodiment of the present invention. The second embodiment employs substantially the same configuration as that of the first embodiment. However, contrary to the first embodiment, the concave or recessed portions 33 are formed on the outer bands 15, and the convex or projected portions 31 on the side of the anchor bracket 21. An operation of the second embodiment is also substantially the same as that of the first embodiment, though the inner peripheral surfaces of the outer bands 15 are required to be smoothed by processing so that the frictional members 19 can be bonded thereon.

Figure 7:
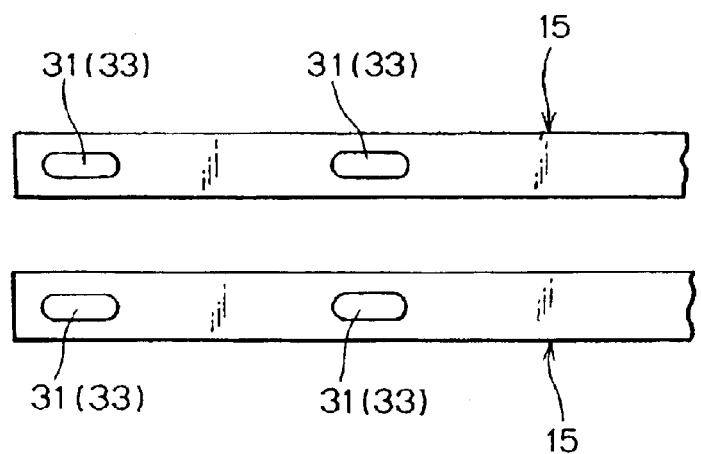
FIG. 7 is a plan view for showing the outer band according to the third embodiment.
Figure 8:
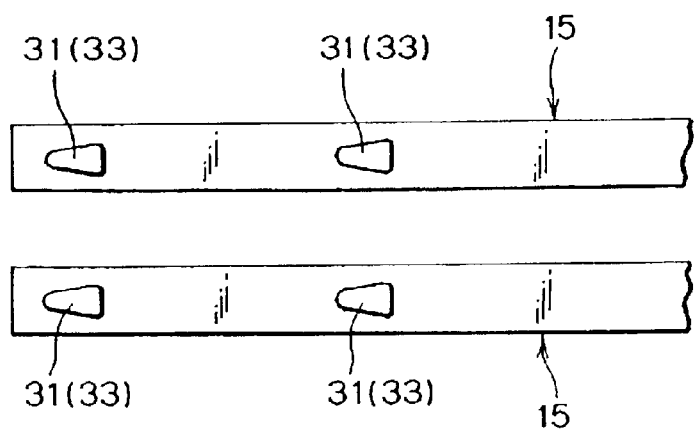
FIG. 8 is a plan view for showing the outer band according to the fourth embodiment.

FIGS. 7 and 8 respectively show plan views of the outer bands 15 according to third and fourth embodiments of the present invention. As shown in these drawings, in the both embodiments, the shape of each convex or projected portion 31 (or each concave or recessed portion 33) which is formed on the outer band 15 is a modification of that in the first and second embodiments, and takes an elliptical form which is elongated in the circumferential direction of the outer band 15 in the third embodiment, and a triangular form elongated in the circumferential direction of the outer band 15 in the fourth embodiment, in the similar manner. In these embodiments, the size of the convex portion 31 (or the concave portion 33) is smaller in the width direction of the outer band 15, so that the reduction in strength of the outer band 15 especially when the concave portion 33 is formed is suppressed to the minimum.

The specific embodiments of the invention of the present invention are as described above. However, the modes embodying the present invention are not limited to those embodiments. For example, in the foregoing embodiments, the present invention is applied to the double-wound band braking device which is incorporated in an automatic transmission for a car. However, the present invention may be applied to a double-wound band braking device to be used in an industrial machine, or the like, or may be applied to an ordinary band braking device. The present invention may naturally be applied not only to a joined portion between the outer band and the anchor bracket, but also to a joined portion between the intermediate band and the application bracket or a joined portion between the outer band and the coupling plate. Moreover, the brake band and the bracket may be fixed by the use of a strong adhesive, or the like, instead of by brazing. In addition, the specific configurations of the double-wound brake band and the double-wound band braking device may be properly modified within the spirit and scope of the present invention.

According to the first aspect of the present invention, the band braking device having as its constituent elements an annular brake band which has a frictional surface formed on the inner peripheral side thereof and a bracket fixed to an end portion thereof is arranged such that the concave or recessed portions are formed on one of the bracket and the brake band, and the convex or projected portions are formed on the other to be engaged with the concave portions. As a result, it is possible to realize the alignment, for example, by forming a plurality of concave or recessed portions on either one of the brake band and the bracket and by fitting the convex or projected portions formed on the other in these concave or recessed portions, without forming a fragile portion on the brake band. Thus, a crack, or the like, is hardly generated on the brake band due to the peeling off of the wax, and the life of the device can be remarkably enhanced.

Figure 9:
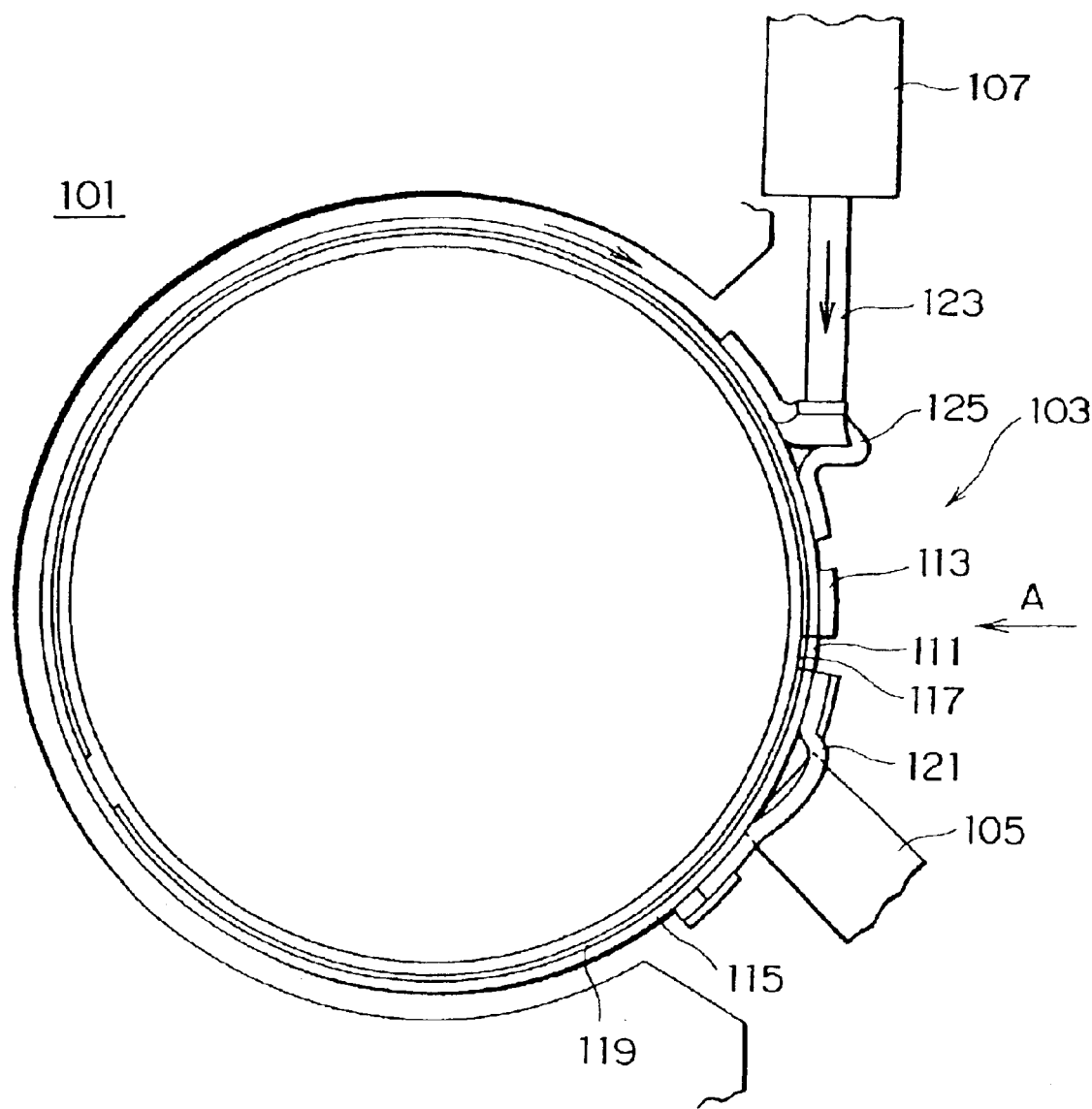
FIG. 9 is a side view for showing a double-wound band braking device according to the fifth embodiment of the invention.
Figure 10:
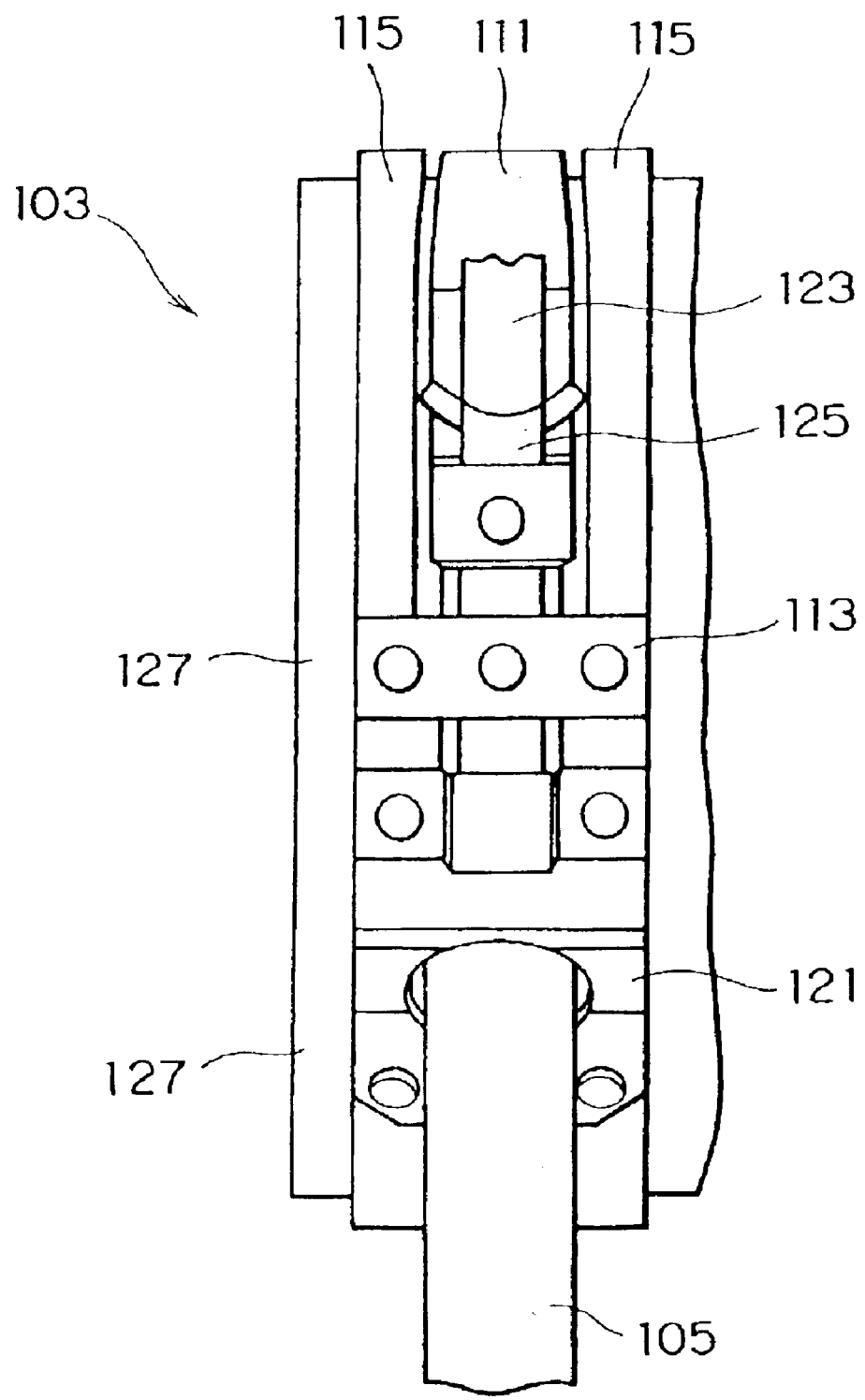
FIG. 10 is a view of the device shown in FIG. 9, seen from the direction indicated by the arrow A.

FIG. 9 shows a double-wound band braking device according to a fifth embodiment of the present invention, seen from a side surface thereof, while FIG. 10 shows the band braking device shown in FIG. 9, seen from the direction indicated by the arrow A (a front view). As shown in these drawings, the double-wound band braking device of the present embodiment comprises a main body casing (transmission casing) 101, a double-wound brake band 103 set inside the main body casing 101, an anchor pin 105 for fixing the double-wound brake band 103 to the main body casing 101, and an actuator 107 for driving the double-wound brake band 103.

The double-wound brake band 103 has as its main constituent members an annular intermediate band 111, and a pair of annular outer bands 115 each of which is fixed to the free end of this intermediate band 111 through a coupling plate 113 in a state where the free ends of both bands are facing each other. Frictional members 117 and 119 are bonded onto the inner peripheral surfaces of the intermediate band 111 and the outer band 115, respectively. While an anchor bracket 121 to be latched by an anchor pin 105 on the main body casing 101 is fixed to the operational end side of the outer bands 115, an application bracket 125 which receives a force in the direction of contracting or reducing the diameters of the intermediate band 111 and the outer bands 115 by means of a push rod 123 of an actuator 107 is fixed to the operational end side of the intermediate band 111. In this double-wound brake band 103, when the push rod 123 of the actuator 107 is operated in the direction indicated by the arrow in FIG. 9, the diameters of the intermediate band 111 and the outer bands 115 are contracted or reduced, so as to apply a brake on a drum 127 which is fitted in the double-wound brake band 103.

Figure 11:
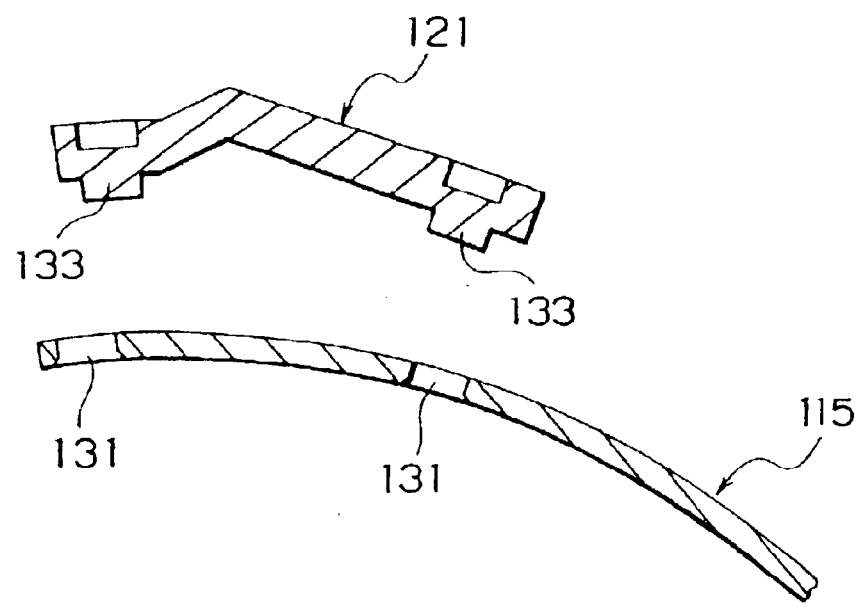
FIG. 11 is a longitudinal cross sectional view for showing the outer band and the anchor bracket in the fifth embodiment.
Figure 12:
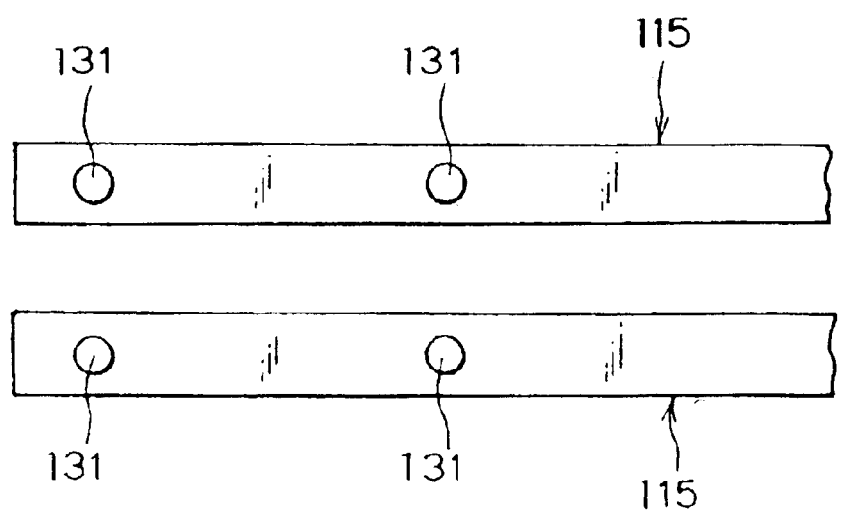
FIG. 12 is a plane view for showing the outer bands according to the fifth embodiment.
Figure 13:
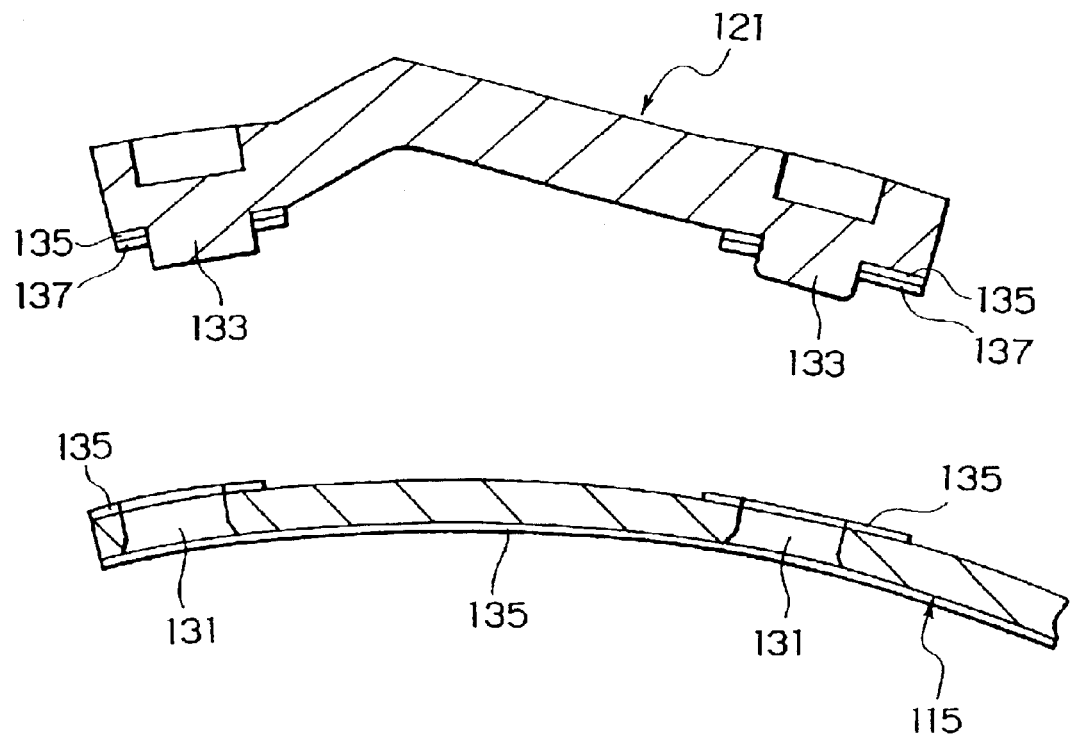
FIG. 13 is a longitudinal cross sectional view for showing the outer band and the anchor bracket in the fifth embodiment.

In case of the fifth embodiment, as shown in FIGS. 11 and 12, four through holes 131 are formed on the outer bands 115, while four cylindrical convex or projected portions 133 are formed on the anchor bracket 121 at positions corresponding to these through holes 131. In order to manufacture the double-wound brake band 103, the assembler sprays primer 135 onto the contact surfaces of the outer band 115 and the anchor bracket 121 by means of a spray gun, or the like, to dry, and then applies an adhesive 137 onto the contact surface of the anchor bracket 121. Note that, for convenience of the description, the film thickness of the primer 135 or the thickness of the applied adhesive 137 is drawn greater in FIG. 13 than that of the actual one.

In this case, a silane coupling agent, or the like, is suitably used as the primer 135 since the outer bands 115 and the anchor bracket 121 are formed of a metal such as a steel plate It becomes easier to apply the adhesive 137 onto the surfaces to be bonded by spraying the primer 135, and also the oil or other residual ingredient on the surfaces is absorbed by the primer 135, thereby satisfactorily bonding the two members together. Not only an epoxy adhesive or a hot-melt adhesive of thermosetting type, but also an epoxy adhesive, a silicon adhesive, or an acrylic adhesive, which is hardened at a room temperature may be used as the adhesive 137. It is also possible to use an urethane or nylon adhesive, a vinyl phenolic adhesive, a nylon epoxy adhesive, or a nitryl phenolic or polyimide adhesive. It is preferable to use an adhesive which is harden at a room temperature as the adhesive 137, in order to enhance the productivity. However, it is also possible to obtain an excellent effect with an adhesive of the thermosetting type if the heat generated in bonding the frictional members 117 and 119 together can be utilized in bonding.

Figure 14:
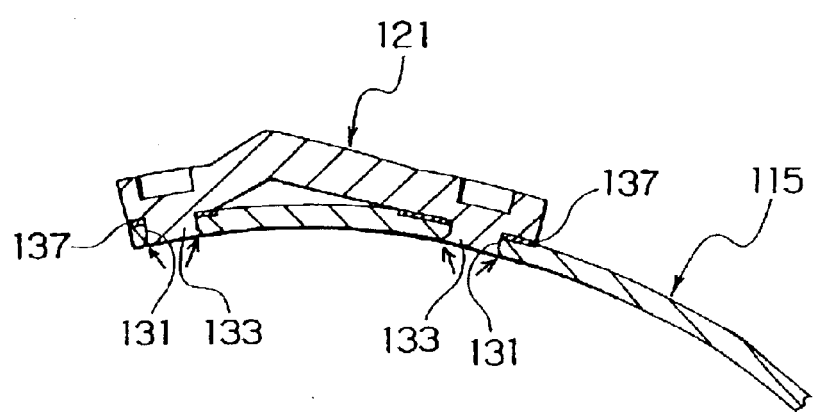
FIG. 14 is a longitudinal cross sectional view for showing a joined state between the outer band and the anchor bracket in the fifth embodiment.
Figure 15:
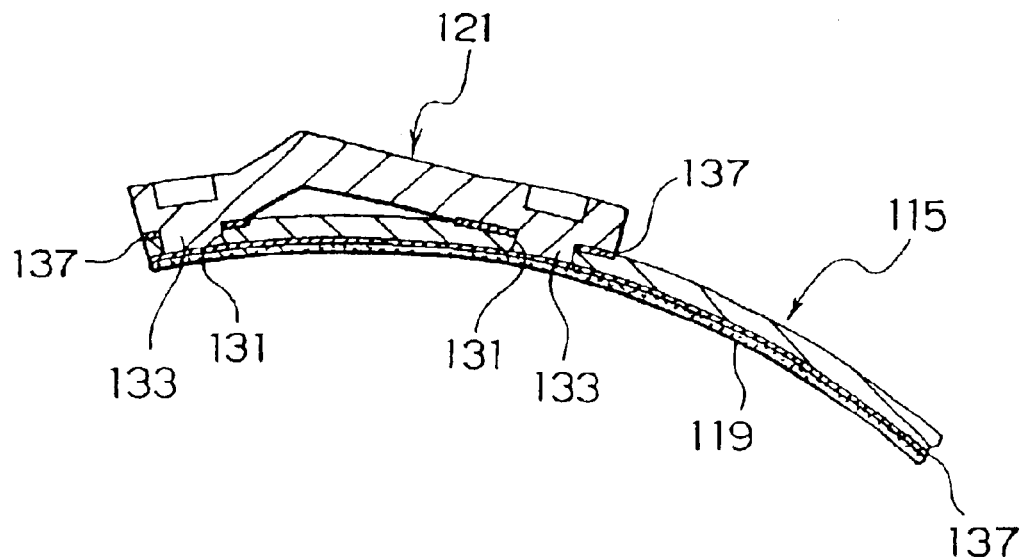
FIG. 15 is a longitudinal cross sectional view for showing an assembled state of the brake band according to the fifth embodiment.
Figure 16:
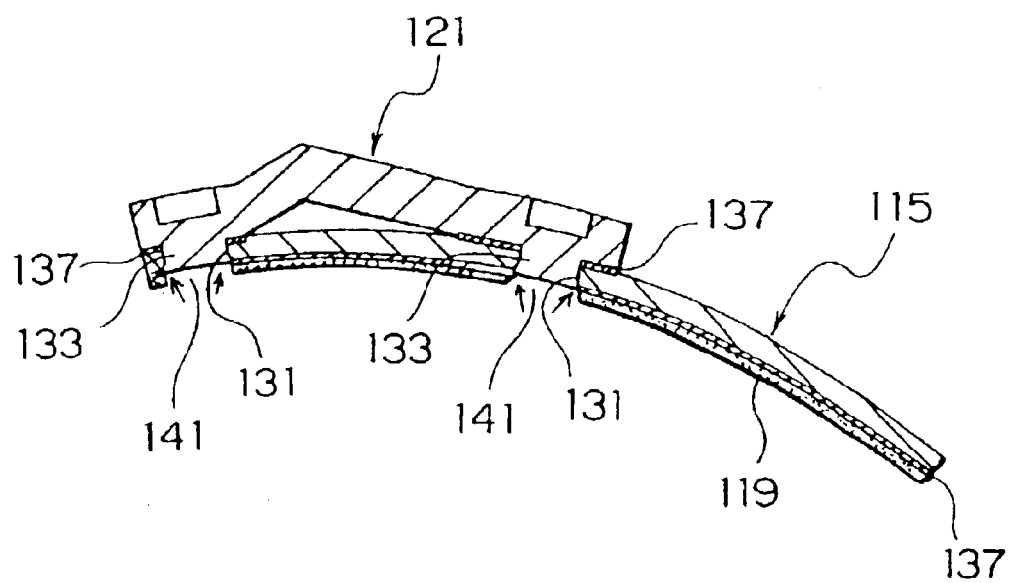
FIG. 16 is a longitudinal cross sectional view for showing the assembled state of the brake band according to the fifth embodiment.

Next, as shown in FIG. 14, after fitting the convex or projected portions 133 of the anchor bracket 121 in the through holes 131 of the outer bands 115, the assembler caulks the tip ends of the convex or projected portions 133. Note that, the through hole 131 is slightly spot-faced on the inner peripheral side of the outer band 115, so as to prevent the convex or projected portion 133 from protruding inward by caulking. After that, the assembler applies the adhesive 137 on the surfaces to be bonded of the frictional members 117 and 119, as shown in FIG. 15, so as to bring the frictional members 117 and 119 into pressure contact with the outer bands 115 by means of a jig, or the like. When a thermosetting adhesive is employed as the adhesive 137, the double-wound brake band 103 is heated for a predetermined time inside a furnace, or the like, and is left for a predetermined time if the adhesive is of the type to be hardened by a room temperature. Note that, as shown in FIG. 16, through holes 141 are formed at the positions corresponding to the through holes 131 of the frictional members 117 and 119. Thus, it becomes possible to bond the frictional members 117 and 119 and the anchor bracket 121 to the outer bands 115 and to caulk the convex portions 133, simultaneously.

In the present embodiment, with the above-mentioned structure, it is possible to enhance the productivity and to reduce the manufacturing cost of the device, compared with a conventional device which requires a brazing step and large-scale equipment necessary therefor.

Figure 17:
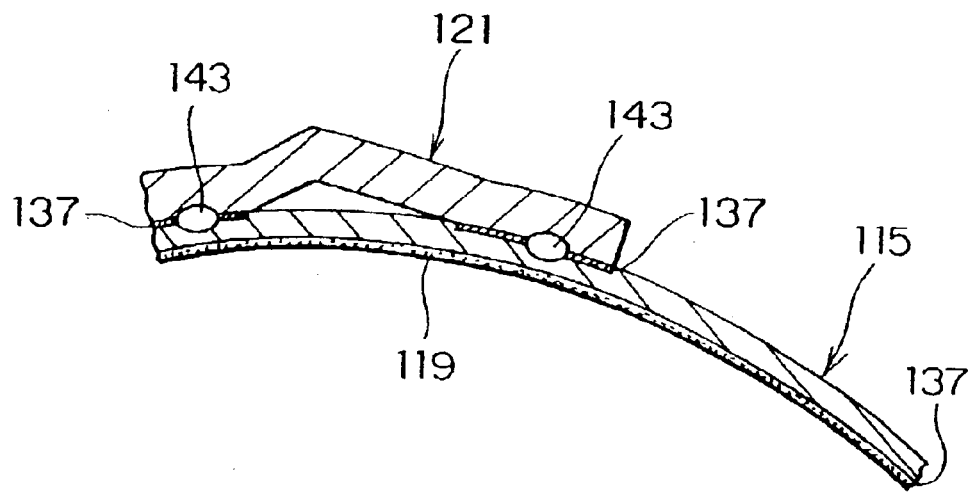
FIG. 17 is a longitudinal cross sectional view for showing an assembled state of the brake band according to the sixth embodiment.

FIG. 17 is a longitudinal view for showing a portion of an outer band according to a sixth embodiment of the invention. The sixth embodiment basically employs the same structure as that of the fifth embodiment described above, except that a spot welding is employed, instead of the caulking. Specifically, in the fifth embodiment, after the outer bands 115 and the anchor bracket 121 are spot-jointed together, the adhesive 137 is caused to penetrate into a gap between the both members by capillary or pressure-fitting, thereby hardening the adhesive 137 thermally or at a room temperature, depending on the type of the adhesive 137. In FIG. 17, reference number 143 denotes a fused portion (nugget) which is generated by the spot welding.

Figure 18:
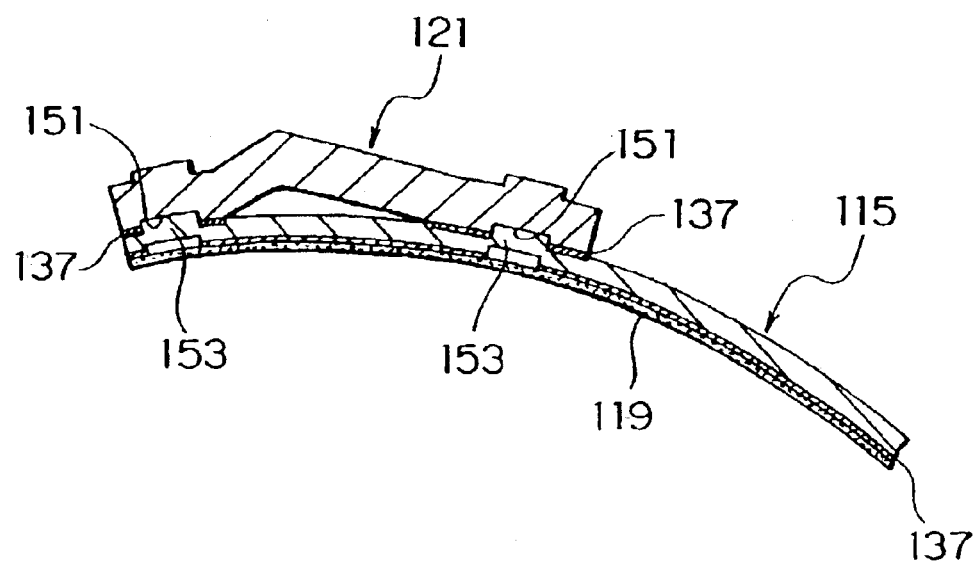
FIG. 18 is a longitudinal cross sectional view for showing an assembled state of the brake band according to the seventh embodiment.
Figure 19:
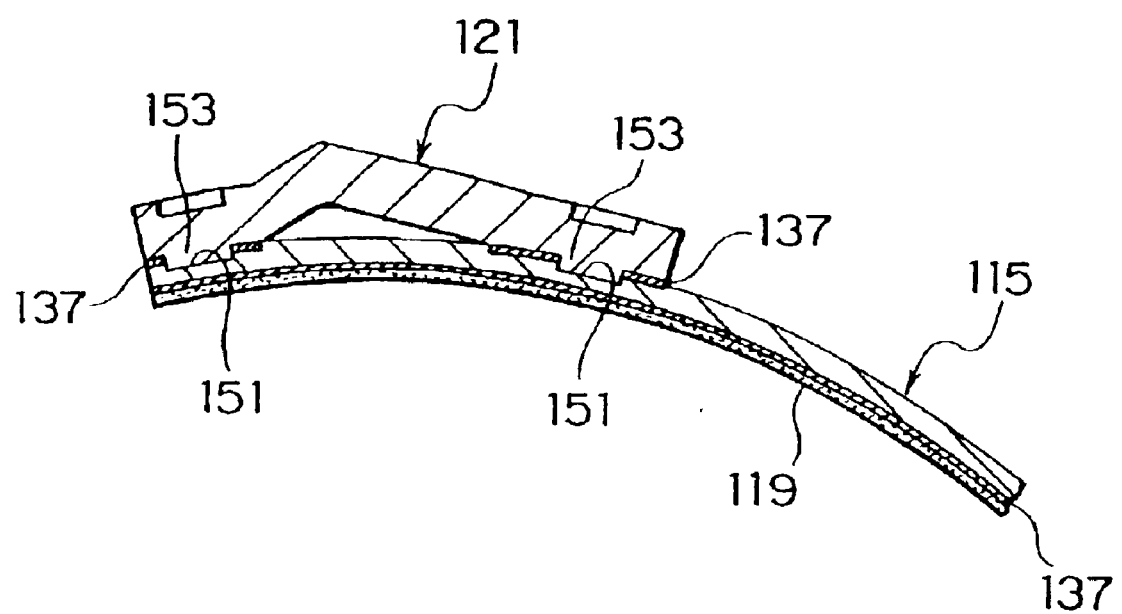
FIG. 19 is a longitudinal cross sectional view for showing an assembled state of the brake band according to the eighth embodiment.
Figure 20:
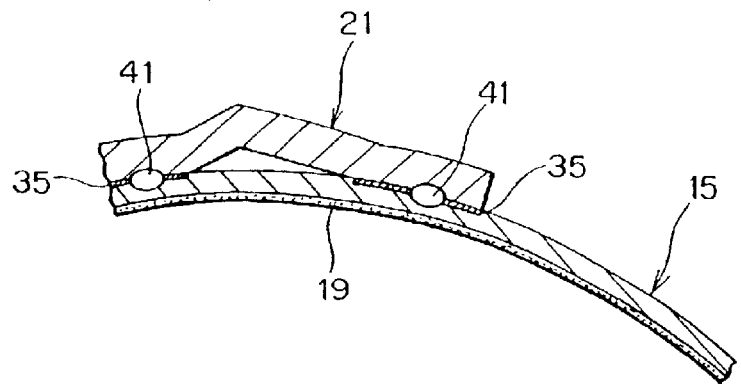
FIG. 20 is a longitudinal cross sectional view of the essential portion of a device for showing a joined portion between the outer band and the anchor bracket in the conventional device.
Figure 21:
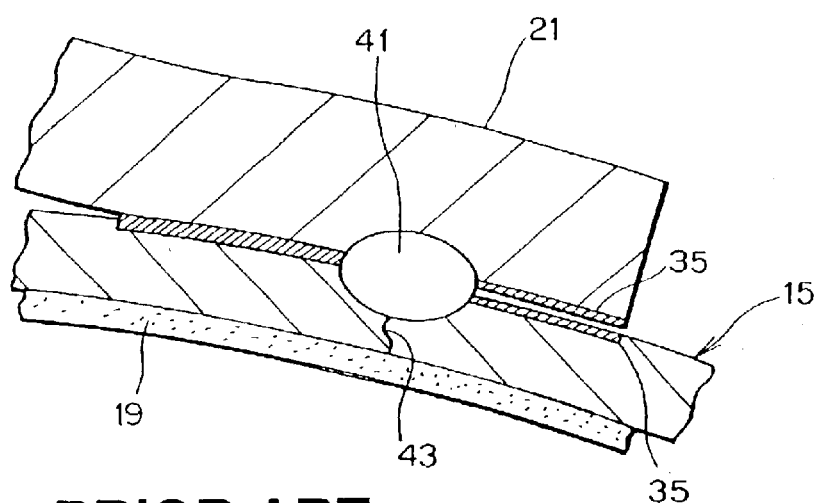
FIG. 21 is an explanatory view for illustrating a peeling-off of the wax and a crack on the outer band in the first conventional device.
Figure 22:
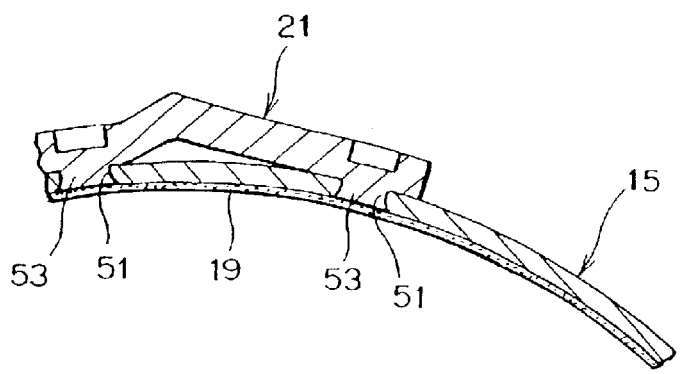
FIG. 22 is a longitudinal cross sectional view of the essential portion of a device for showing a joined portion between the outer band and the anchor bracket in the second conventional device.
Figure 23:
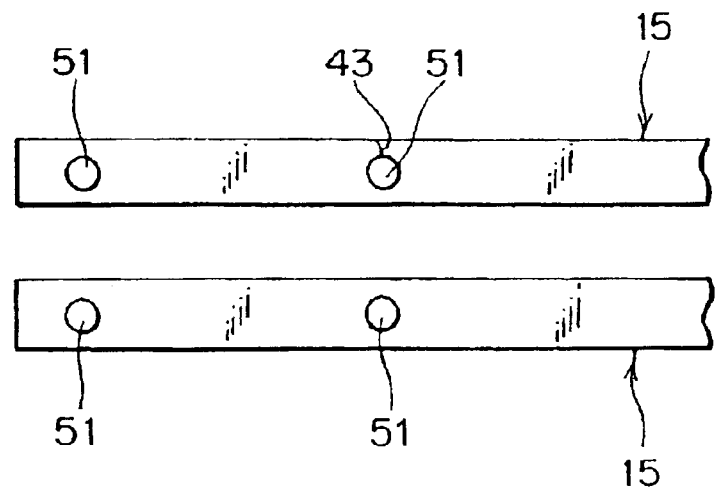
FIG. 23 is an explanatory view for illustrating a crack on the outer band in the second conventional device.
Figure 24:
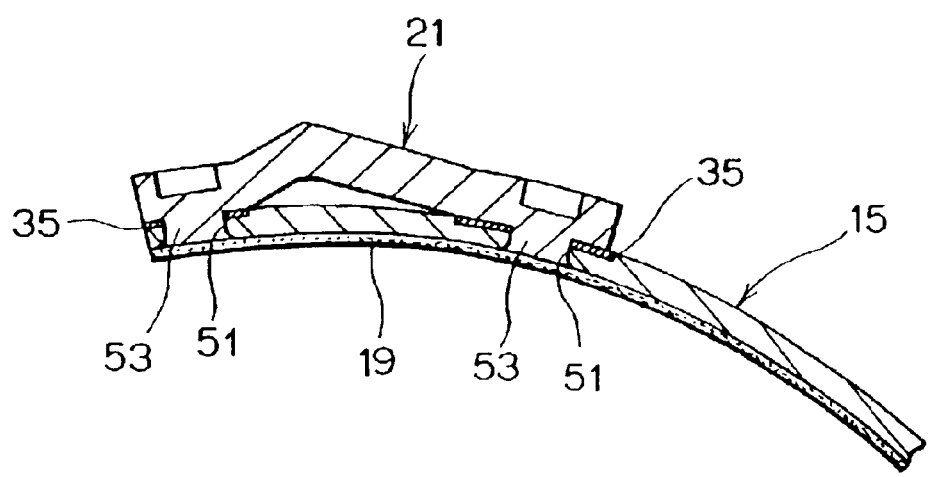
FIG. 24 is a longitudinal cross sectional view of the essential portion of a device for showing a joined portion between the outer band and the anchor bracket in the third conventional device.

FIGS. 18 and 19 respectively show longitudinal cross sections of the essential portions of seventh and eighth embodiments of the invention. The both embodiments also employ the structures which are basically the same as that of first embodiment, except that engagement between the concave or recessed portions and the convex or projected portions is employed, instead of caulking. Specifically, in the seventh embodiment, while convex or projected portions 153 are formed on the outer bands, concave or recessed portions 151 are formed on the anchor bracket 121 to be corresponding to the convex or projected portions 153. The convex or projected portions 153 are fitted in the concave or recessed portions 151 to be latched and positioned. Note that frictional members 117 and 119 may be bonded to the outer bands 115 either prior or subsequent to the bonding of the anchor bracket 121 to the outer bands 115, like in the sixth embodiment.

An embodiment of the second aspect of the present invention is not limited to the foregoing fifth to eighth embodiments. For instance, in each of the foregoing embodiments, the present invention is applied to a double-wound band braking device which is assembled in an automatic transmission for a car. However, the present invention may be applied to another type of a double-wound band braking device which is used in an industrial machine, or the like. In addition, the present invention is not limitedly applied to a joined portion between the outer bands and the anchor bracket, but may be applied to a joined portion between an intermediate band and the application bracket, or to a joined portion among the intermediate band, the outer bands and the coupling plate. Though the primer is not referred to except in the fifth embodiment, it is obviously effective to apply the primer on a metallic member in any other embodiment of the fifth to eighth embodiments. Also, the fifth and eighth embodiments employ the arrangement that one member is provided with the concave portions while the other with convex or projected portions. However, the convex or projected portions and the concave or recessed portions may be provided on the both members in a predetermined number to face other. Also, the types of the adhesive and the primer or the processing method thereof are not limited to these described above, but a variety of other types and methods may be employed. Further, the specific configurations of the brake band and the braking device may be properly altered within a spirit and range of the second aspect of the present invention.

According to the second aspect of the present invention, the band braking device having the annular brake band which has the frictional surface formed on the inner peripheral side thereof and the bracket fixed to the end portion on the outer peripheral side thereof is arranged such that the bracket and the brake band are bonded together by an adhesive. As a result, it is possible to enhance the productivity and to reduce the manufacturing cost by applying the thermosetting adhesive on the bracket or on the brake band, and then by pressing with pressure and heating the both members to be bonded together securely.

What is claimed is:

1. A band braking device having an annular brake band which has an inner peripheral surface on which a frictional surface member is fixedly provided and an outer peripheral surface, and a bracket having an inner peripheral surface fixed on the outer peripheral surface of an end portion of said brake band, characterized in that:

said brake band is a double-wound brake band comprising an intermediate band and an outer band; and at least one recess having a bottom wall is formed on the outer peripheral surface of said brake band, and at least one projection is formed on said bracket and fixedly engages said at least one recess;

wherein the inner peripheral surface of said brake band is substantially free of projections; and wherein said bracket and said brake band are fixed together by brazing.

2. A band braking device having an annular brake band which has an inner peripheral surface on which a frictional surface member is fixedly provided and an outer peripheral surface, and a bracket having an inner peripheral surface fixed on the outer peripheral surface of an end portion of said brake band, characterized in that:

said brake band is a double-wound brake band comprising an intermediate band and an outer band; and at least one recess having a bottom wall is formed on the outer peripheral surface of said brake band and at least one projection is formed on said bracket and engages said at least one recess;

wherein the inner peripheral surface of said brake band is substantially free of projections; and wherein the inner peripheral surface of said bracket and the outer peripheral surface of said brake band have a primer applied thereto and are bonded together by an adhesive.

* * * * *